R. W. AMMONS.
NUT LOCKING WASHER.
APPLICATION FILED DEC. 23, 1910.
997,359.
Patented July 11, 1911.
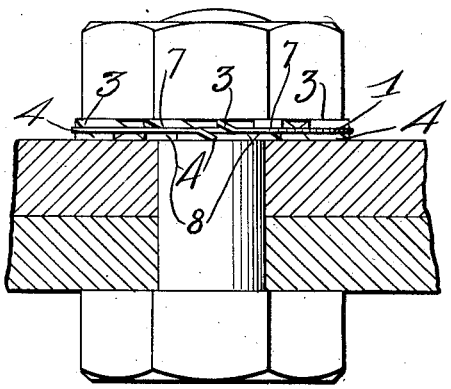
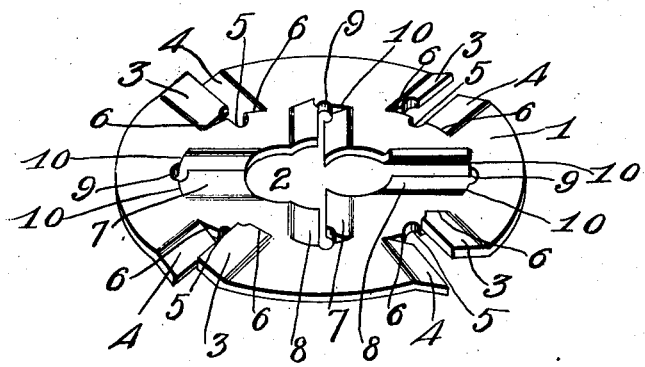
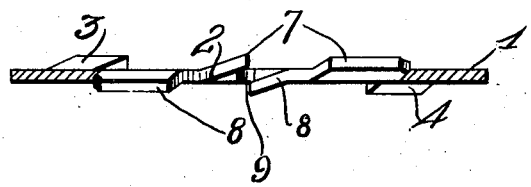
Witnesses
J. R. Pierce
O. B. Hopkins
Inventor
R. W. Ammons.
by H. B. Willson & Co.
Attorneys

UNITED STATES PATENT OFFICE.

RALPH W. AMMONS, OF LOS ANGELES, CALIFORNIA.

NUT-LOCKING WASHER.

997,359.

Specification of Letters Patent.   Patented July 11, 1911.

Application filed December 23, 1910. Serial No. 598,969.

*To all whom it may concern:*

Be it known that I, RALPH W. AMMONS, a citizen of the United States, residing at Los Angeles, in the county of Los Angeles and State of California, have invented certain new and useful Improvements in Nut-Locking Washers; and I do declare the following to be a full, clear, and exact description of the invention, such as will enable others skilled in the art to which it appertains to make and use the same.

This invention relates to improvements in nut locking washers.

One object of the invention is to provide a washer of this character having an improved construction and arrangement of locking devices adapted to engage the inner side of the nut and the outer surface of the object to which the same is applied.
Another object is to provide a nut locking washer which will be simple, strong and durable in construction efficient and reliable in operation and in which the locking device may be readily arranged to permit the use of the washer with both right and left hand nuts.

With the foregoing and other objects in view, the invention consists of certain novel features of construction, combination and arrangement of parts as will be more fully described and particularly pointed out in the appended claims.

In the accompanying drawings: Figure 1 is a side elevation of a bolt and nut and a sectional view through two plates fastened together thereby showing the application of the washer; Fig. 2 is a perspective view of the washer; Fig. 3 is a vertical cross sectional view of the same.
My improved nut locking washer comprises a disk 1 formed of spring metal. The washer may be of any suitable size and shape and is here shown as being of circular form and having a centrally disposed circular opening 2 to receive the bolt to which the same is applied. Around the outer edge of the washer and spaced at suitable distances apart are a series of radially disposed oppositely bent locking teeth 3 and 4 said teeth being formed by forming radially disposed slits at the outer ends of the washer said slits terminating at their inner ends in holes or passages 5. In the washer are also formed short segmental slits 6 which communicate with the holes or passages 5. The parts of the washer thus cut by the radial slits and the segmental slits 6 are bent in opposite directions to form the teeth 3 and 4. The outer corners of the teeth when thus formed provide sharp edges which bite or cut into the inner surface of the nut and the adjacent surface of the object to which the washer is applied. In the center of the washer around the opening 2 is also formed an inner series of radially disposed oppositely projecting locking teeth 7 and 8 which are formed by slitting the metal outwardly from the edges of the opening 2, said slits terminating in holes or passages 9 with which also communicate segmental slits 10. The material thus cut is bent in opposite directions and forms the teeth 7 and 8. The inner series of teeth 7 and 8 are arranged between the outer series of teeth 3 and 4 as shown.

The spring action of the teeth which engage the inner face of the nut and the adjacent surface of the object when the nut is screwed down into engagement with the washer, will cause the sharp corners of the teeth to frictionally engage or bite into the engaging portions of the nut or object thus preventing the washer from turning on the object and the nut from turning on the washer. By thus constructing the teeth the washer has a double locking capacity thereby insuring the firm holding of the nut against casual unscrewing from the bolt.

In the accompanying drawings, the teeth of the washer are shown as being arranged for locking a right hand threaded nut, it will be obvious however that by simply bending the teeth in an opposite direction to that shown, that the washer may be employed for locking a left hand threaded nut.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention what I claim is:

1. A nut locking washer having formed therein outer and inner series of radially disposed locking teeth, said teeth being arranged in pairs and the teeth of each pair projecting in opposite directions with the opposite sides of the washer whereby the outer corners of the teeth form sharp cutting edges adapted to bite into the engaging surfaces of the nut or object to which the same is applied thereby holding the nut against unscrewing, said teeth being adapted to be bent in reverse directions whereby the washer may be employed for locking either right or left hand threaded nuts.

2. A nut locking washer having formed therein inner and outer series of radially disposed slits, said slits terminating at their inner ends in holes or passages with which also connect segmental slits, said slitted portions of the washer forming teeth, said teeth being bent in opposite directions to project beyond the opposite side of the washer whereby the outer corners of the teeth will bite into the engaging portions of the nut and object to which the same is applied thereby holding the nut against unscrewing.

3. A locking washer having formed therein, an outer series of locking teeth and an inner series of locking teeth, said teeth being arranged in pairs and the teeth of the inner series arranged opposite the spaces between the teeth of the outer series, the teeth of each pair being bent in opposite directions to project beyond the opposite sides of the washer whereby a locking engagement is had both with the inner side of the nut and the outer surface of the object to which the same is applied.

In testimony whereof I have hereunto set my hand in presence of two subscribing witnesses.

RALPH W. AMMONS.

Witnesses:
C. H. CASE,
R. H. GRAY.